United States Patent
Liu et al.

(10) Patent No.: US 9,075,260 B2
(45) Date of Patent: Jul. 7, 2015

(54) TOUCH DISPLAY APPARATUS

(71) Applicant: Hannstar Display Corporation, New Taipei (TW)

(72) Inventors: Chun-Pin Liu, Taipei (TW); Chin-Wei Lin, Tainan (TW)

(73) Assignee: HannStar Display Corporation, Taipei (TW)

( * ) Notice: Subject to any disclaimer, the term of this patent is extended or adjusted under 35 U.S.C. 154(b) by 149 days.

(21) Appl. No.: 14/052,772

(22) Filed: Oct. 13, 2013

(65) Prior Publication Data

US 2015/0049257 A1 Feb. 19, 2015

(30) Foreign Application Priority Data

Aug. 14, 2013 (CN) .......................... 2013 2 0496230

(51) Int. Cl.
```
G06F 3/041      (2006.01)
G02F 1/1333     (2006.01)
G02F 1/1345     (2006.01)
G02F 1/1362     (2006.01)
G02F 1/1368     (2006.01)
```
(52) U.S. Cl.
CPC ........ *G02F 1/13338* (2013.01); *G02F 1/13452* (2013.01); *G02F 1/1362* (2013.01); *G02F 2001/13685* (2013.01)

(58) Field of Classification Search
CPC ... G06F 3/04865; G06F 3/0487; G06F 3/044; G06F 3/04875; G06F 3/045
USPC ..................... 345/173–179; 178/18.01–18.04
See application file for complete search history.

(56) References Cited

U.S. PATENT DOCUMENTS

2010/0295800 A1   11/2010  Kuo
2014/0204284 A1*  7/2014   Yao et al. ........................ 349/12

FOREIGN PATENT DOCUMENTS

TW         M375251         3/2010

* cited by examiner

*Primary Examiner* — Kimnhung Nguyen
(74) *Attorney, Agent, or Firm* — Jianq Chyun IP Office (57) ABSTRACT

A touch display apparatus including a display panel, a touch device layer, a first flexible circuit board and a second flexible circuit board is provided. The display panel includes a color filter substrate, an active device array substrate and a display medium layer. The active device array substrate is disposed above the color filter substrate. The display medium layer is disposed between the color filter substrate and the active device array substrate. The touch device layer is disposed on an outer surface of the active device array substrate. The first flexible circuit board is disposed on the outer surface and an edge of the active device array substrate and is electrically connected to the touch device layer. The second flexible circuit board is disposed on an inner surface opposite to the outer surface and the edge of the active device array substrate.

20 Claims, 6 Drawing Sheets

TOUCH DISPLAY APPARATUS

CROSS-REFERENCE TO RELATED APPLICATION

This application claims the priority benefit of China application serial no. 201320496230.2, filed on Aug. 14, 2013. The entirety of the above-mentioned patent application is hereby incorporated by reference herein and made a part of this specification.

BACKGROUND OF THE INVENTION

1. Field of the Invention

The invention generally relates to an electronic apparatus, and more particularly, to a touch display apparatus.

2. Description of Related Art

Figure 1A:
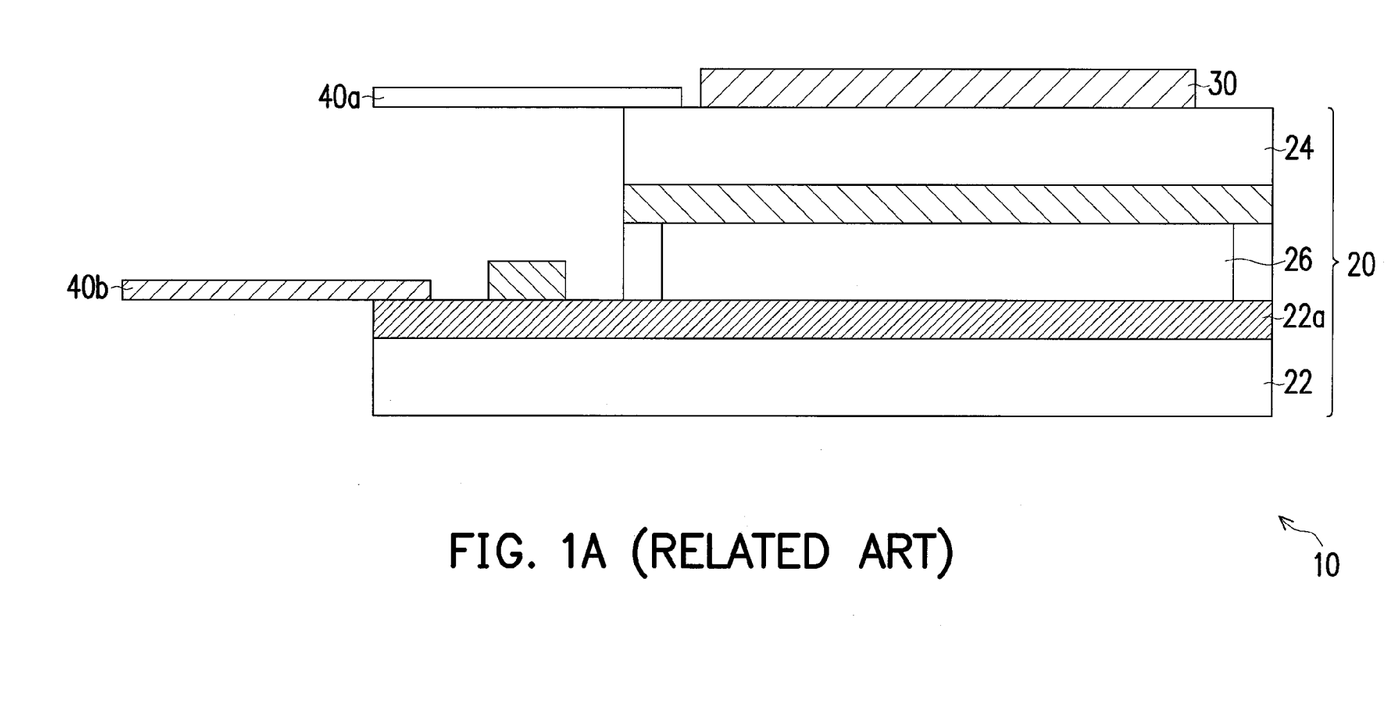
FIG. 1A is a cross-sectional view of a conventional touch display apparatus.
Figure 1B:
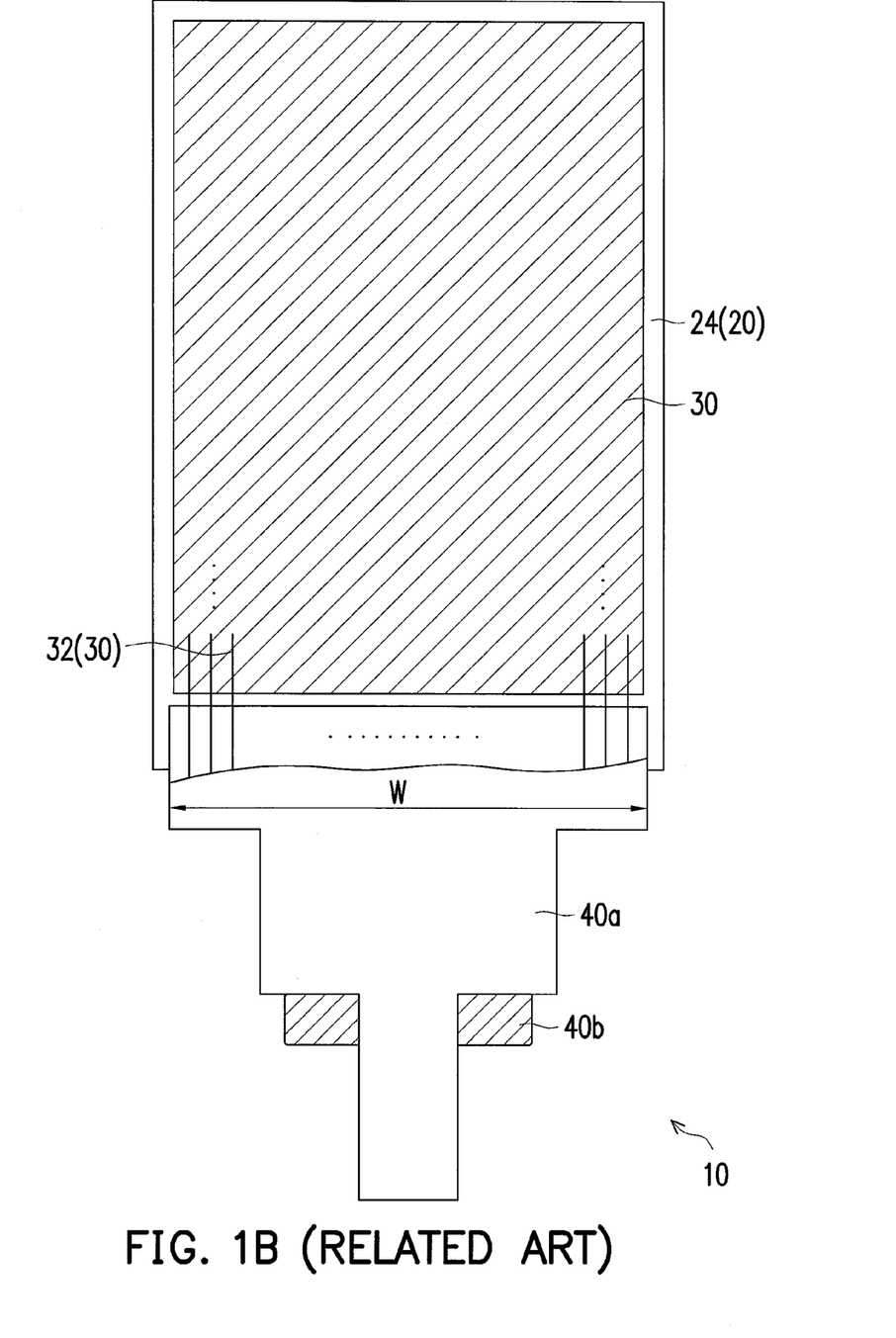
FIG. 1B is a top view of the conventional touch display apparatus of FIG. 1A.

Generally, in a touch display apparatus, a touch panel is embedded in (in-cell) or externally attached to (on-cell) a display panel, such that the touch display apparatus has both of a touch sensing function and a display function. FIG. 1A is a cross-sectional view of a conventional touch display apparatus. FIG. 1B is a top view of the conventional touch display apparatus of FIG. 1A. Referring to FIG. 1A and FIG. 1B, a display panel 20 is composed of an active device array substrate 22 with a larger size, a color filter substrate 24 with a smaller size and a display medium layer 26 disposed between the active device array substrate 22 and the color filter substrate 24. Regarding the on-cell touch display panel 10, a touch device layer 30 is generally disposed on an outer surface of the color filter substrate 24 with a smaller size of the display panel 20, so that a circuit layout space of the touch device layer 30 is directly limited by the size of the color filter substrate 24. Moreover, the touch device layer 30 and an active device layer 22a on the active device array substrate 22 are electrically connected to flexible circuit boards 40a and 40b respectively disposed on the outer surface of the color filter substrate 24 and an inner surface of the active device array substrate 22.

For sake of aesthetic, the display panel 20 is generally required to have a larger display area, so that a technical development trend of slim border is formed. To cope with the design requirement of slim border of the display panel 20, the touch panel also has the design requirement of slim border, and a circuit layout space of peripheral lines 32 of the touch device layer 30 on the color filter substrate 24 with limited area is further decreased. Therefore, under a layout of the same device number, as that shown in FIG. 1B, the peripheral lines 32 of the touch device layer 30 have to extend to the edge of the color filter substrate 24 in a straight-line manner, and are further electrically connected to the flexible circuit board 40a with a size suitable for simultaneously bonding the peripheral lines 32.

Since the peripheral lines 32 extend in the straight-line manner, a width W of the corresponding flexible circuit board 40a is larger, i.e. the size of the flexible circuit board 40a has to be greater than or equal to a distribution width of the peripheral lines 32. In this way, the cost of the touch display panel 10 is higher. Moreover, since a machine used for bonding the flexible circuit board 40a with the peripheral lines 32 of the touch device layer 30 has a limitation in a bonding width, the flexible circuit board 40a with larger size probably cannot be bonded through such machine, which increases bonding difficulty.

SUMMARY OF THE INVENTION

Accordingly, the invention is directed to a touch display apparatus, in which a touch device layer is externally attached to (on-cell) an active device array substrate of a display panel.

To achieve one of or all aforementioned and other advantages, the invention provides a touch display apparatus including a display panel, a touch device layer, at least one first flexible circuit board and at least one second flexible circuit board. The display panel includes a color filter substrate, an active device array substrate and a display medium layer. The active device array substrate is disposed above the color filter substrate. The display medium layer is disposed between the color filter substrate and the active device array substrate. The touch device layer is disposed on an outer surface of the active device array substrate. The first flexible circuit board is disposed on the outer surface and an edge of the active device array substrate and is electrically connected to the touch device layer. The second flexible circuit board is disposed on an inner surface opposite to the outer surface and the edge of the active device array substrate.

In an embodiment of the invention, the color filter substrate includes a first substrate and a color filter layer located on the first substrate, and the active device array substrate includes a second substrate and an active device layer located on the second substrate.

In an embodiment of the invention, the second flexible circuit board is electrically connected to the active device layer.

In an embodiment of the invention, a size of the second substrate is greater than a size of the first substrate.

In an embodiment of the invention, a profile of an orthogonal projection of the first flexible circuit board on the active device array substrate has a connection edge, and a length of the connection edge is smaller than ⅔ of a length of the corresponding edge.

In an embodiment of the invention, the touch device layer includes a plurality of first sensing series, a plurality of second sensing series and a plurality of transmission lines. Each of the first sensing series extends along a first direction. Each of the second sensing series extends along a second direction intersected with the first direction, and the first sensing series are electrically insulated to the second sensing series. The transmission lines are disposed at peripheral of the second substrate, and each of the transmission lines is connected to one of the first sensing series and the second sensing series.

In an embodiment of the invention, the transmission lines are a plurality of fan-in wires.

In an embodiment of the invention, the display panel further includes a sealant, the first substrate and the substrate are assembled through the sealant.

In an embodiment of the invention, the connection edge of the first flexible circuit board has 65-135 pins.

In an embodiment of the invention, a profile of the first flexible circuit board has a T-shape.

In an embodiment of the invention, the first flexible circuit board has a tail end, and the tail end has 4-10 pins.

In an embodiment of the invention, the touch display apparatus further includes a driving chip. The driving chip is disposed on the active device array substrate, and the driving chip and the second flexible circuit board are located on the same surface.

In an embodiment of the invention, the active device array substrate has a pair of long sides and a pair of short sides.

In an embodiment of the invention, the first flexible circuit board and the second flexible circuit board are located on one of the short sides.

In an embodiment of the invention, the touch display panel is a small size touch display panel.

In an embodiment of the invention, the at least one first flexible circuit board is two first flexible circuit boards, the at least one second flexible circuit board is two second flexible circuit boards, and the first flexible circuit boards and the second circuit boards are located on the one long side.

In an embodiment of the invention, the touch display panel is a large size touch display panel.

In an embodiment of the invention, the display panel comprises a liquid crystal display panel.

In an embodiment of the invention, the display medium layer comprises a liquid crystal layer.

In an embodiment of the invention, the touch display apparatus further includes an upper polarizer and a lower polarizer. The upper polarizer is disposed on an outer surface of the touch device layer. The lower polarize is disposed on an outer surface of the color filter substrate.

In view of the foregoing, since the touch device layer of the invention is disposed on the active device array substrate with a larger size of the display panel, the active device array substrate may provide a larger circuit layout space compared to that of the color filter substrate. Moreover, since the circuit layout space of the active device array substrate is larger, configuration of the devices (i.e. the transmission lines) of the touch device layer can be adjusted through the circuit layout space, such that the size of the first flexible circuit board is unnecessary to be very large for bonding and can be electrically connected to the touch device layer. In this way, the production cost of the touch display apparatus of the invention is decreased, and bonding easiness is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 2A:
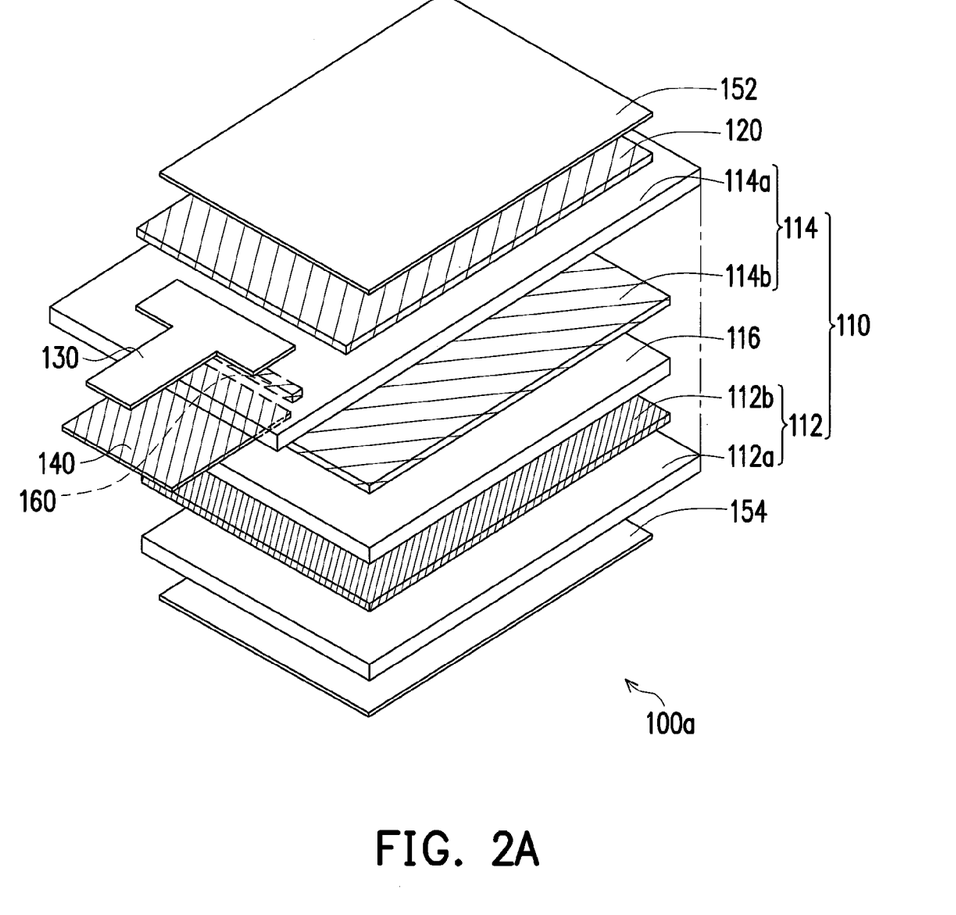
FIG. 2A is a three-dimensional exploded view of a touch display apparatus according to an embodiment of the invention.
Figure 2B:
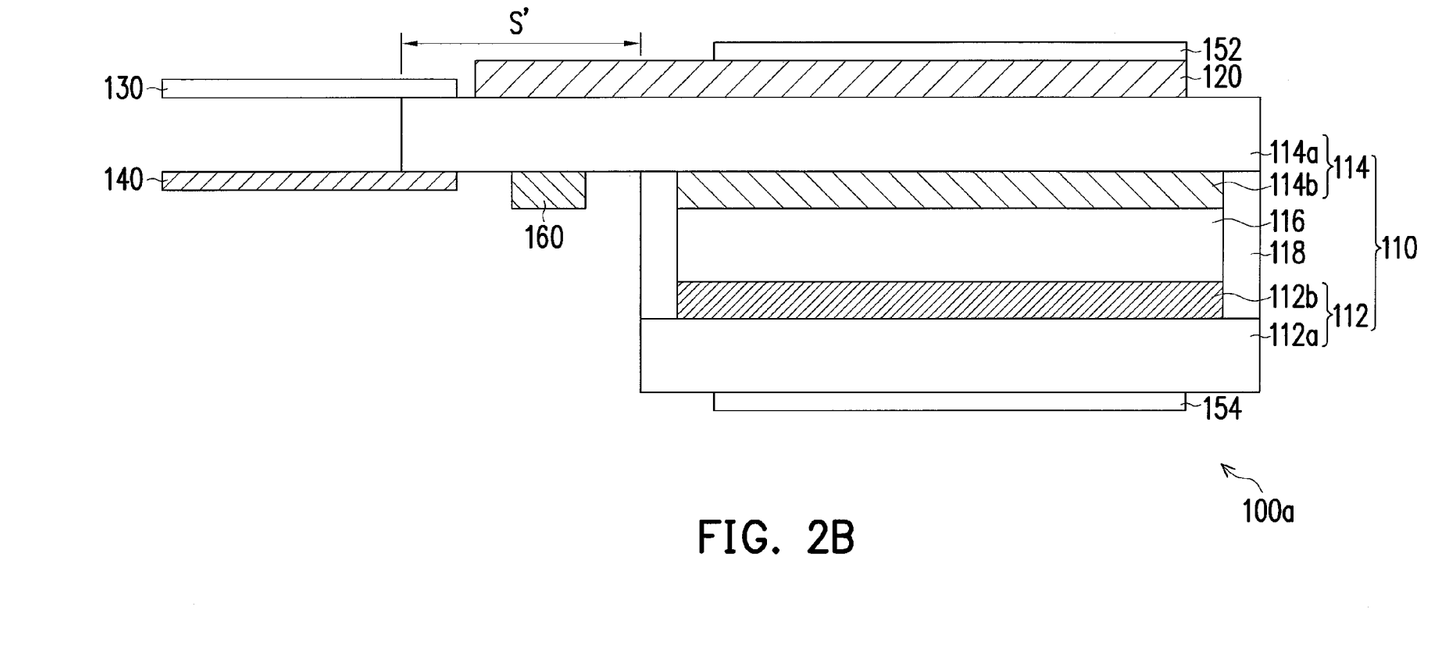
FIG. 2B is a cross-sectional view of the touch display apparatus of FIG. 2A.
Figure 2C:
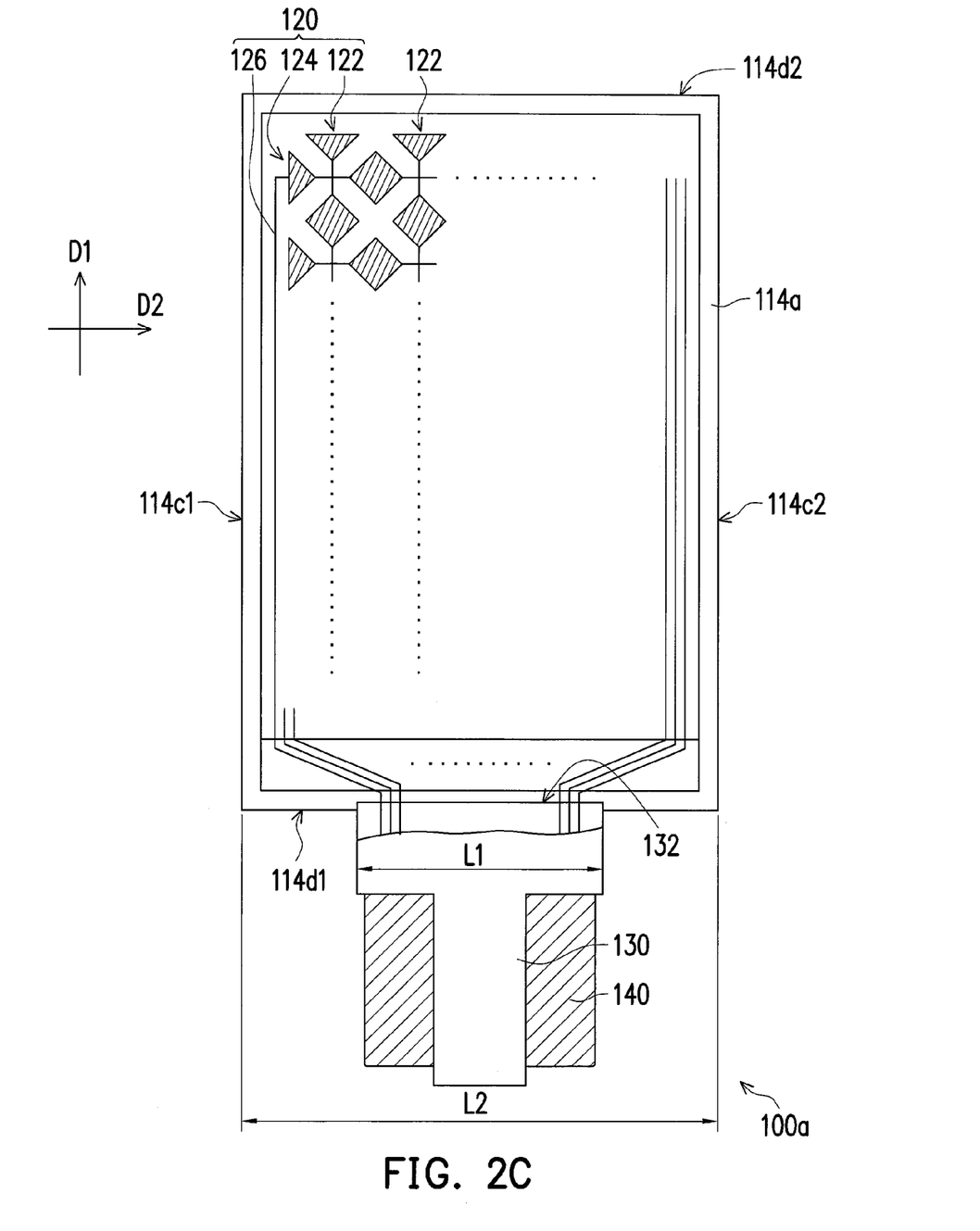
FIG. 2C is a top view of the touch display apparatus of FIG. 2A.

FIG. 2A is a three-dimensional exploded view of a touch display apparatus according to an embodiment of the invention. FIG. 2B is a cross-sectional view of the touch display apparatus of FIG. 2A. FIG. 2C is a top view of the touch display apparatus of FIG. 2A. For simplicity's sake, a part of components are not illustrated in FIG. 2A, and in FIG. 2C, some components are illustrated in a perspective manner. Referring to FIG. 2A and FIG. 2B, in the present embodiment, the touch display apparatus 100a includes a display panel 110, a touch device layer 120, a first flexible circuit board 130 and a second flexible circuit board 140.

In detail, the display panel 110 includes a color filter substrate 112, an active device array substrate 114 and a display medium layer 116. The active device array substrate 114 is disposed above the color filter substrate 112. The display medium layer 116 is disposed between the color filter substrate 112 and the active device array substrate 114. The touch device layer 120 is disposed on an outer surface of the active device array substrate 114 apart from the color filter substrate 112. The first flexible circuit board 130 is disposed on the outer surface and an edge of the active device array substrate 114 and is electrically connected to the touch device layer 120. The second flexible circuit board 140 is disposed on an inner surface and the edge of the active device array substrate 114 and is electrically connected to the active device array substrate 114. The first flexible circuit board 130 and the second flexible circuit board 140 are respectively located at the outer surface and the inner surface of the active device array substrate 114.

In detail, the display panel 110 of the present embodiment is a liquid crystal display panel, in which the color filter substrate 112 includes a first substrate 112a and a color filter layer 112b located on the first substrate 112a, and the active device array substrate 114 includes a second substrate 114a and an active device layer 114b located on the second substrate 114a, where a size of the second substrate 114a is greater than a size of the first substrate 112a. The display medium layer 116 is, for example, a liquid crystal layer, and the color filter layer 112b and the active device layer 114b are respectively located at an inner surface and an opposite outer surface of the display medium layer 116, and the second flexible circuit board 140 is electrically connected to the active device layer 114b. Moreover, the display panel 110 further includes a sealant 118, where the first substrate 112a and the second substrate 114a are assembled through the sealant 118.

Referring to FIG. 2C, the touch device layer 120 of the present embodiment includes a plurality of first sensing series 122, a plurality of second sensing series 124 and a plurality of transmission lines 126. Each of the first sensing series 122 extends along a first direction D1. Each of the second sensing series 124 extends along a second direction D2, where the first direction D1 is intersected with the second direction D2, and the first sensing series 122 are electrically insulated to the second sensing series 124. The transmission lines 126 are disposed at peripheral of the second substrate 114a, and each of the transmission lines 126 is connected to one of the first sensing series 122 and the second sensing series 124.

Referring to FIG. 2A and FIG. 2C, the active device array substrate 114 of the display panel 110 has a pair of long sides 114c1, 114c2 and a pair of short sides 114d1, 114d2. The first flexible circuit board 130 and the second flexible circuit board 140 are located on the short side 114d1. A profile of an orthogonal projection of the first flexible circuit board 130 on the active device array substrate 114 has a connection edge 132, preferably, a length L1 of the connection edge 132 is smaller than ⅔ of a length L2 of the corresponding short side 114d1, and the corresponding number of pins can be decreased to ⅔, for example, the part originally requiring 100-200 pins can now be decreased to 65-135 pins. As that shown in FIG. 2A and FIG. 2C, the profile of the first flexible circuit board 130 has a T-shape, and a tail end of the T-shape generally has 4-10 pins required to be connected to a client terminal. Moreover, the touch display panel 100a of the present embodiment is, for example, a small size touch display panel, and in case of the small size panel, it is only required to dispose the single first flexible circuit board 130 and the single second flexible circuit board 140 on the short side 114d1 of the active device array substrate 114 to complete circuit coupling.

Moreover, in order to add a light filtering effect and decrease a crosstalk phenomenon, the touch display apparatus 100a of the present embodiment may further include an upper polarizer 152 and a lower polarizer 154. The upper polarizer 152 is disposed on an outer surface of the touch device layer 120. The lower polarizer 154 is disposed on an outer surface of the color filter substrate 112. Moreover, the touch display apparatus 100a further includes a driving chip 160. The driving chip 160 is disposed on the inner surface of the active device array substrate 114 and is electrically connected to the active device layer 114b of the active device array substrate 114. As that shown in FIG. 2A, the driving chip 160 and the second flexible circuit board 140 are located on the same surface of the active device array substrate 114.

Since the touch device layer 120 is disposed on the second substrate 114a of the active device array substrate 114 of the display panel 110 that has a larger size, compared to the existing technique that the touch device layer 30 is disposed on the color filter substrate 24, the present embodiment may have an additional circuit layout space S, i.e. the additional space of the active device array substrate 114 relative to the color filter substrate 112. Moreover, the circuit layout space S on the active device array substrate 114 is large, so that configuration of the transmission lines 126 of the touch device layer 120 can be adjusted through the circuit layout space S. As that shown in FIG. 2C, the transmission lines 126 are fan-in wires, i.e. a pitch between the transmission lines 126 is decreased towards the edge of the active device array substrate 114 without connecting through the straight-line extending manner. In this way, compared to the existing touch display panels, the size L1 of the first flexible circuit board 130 is unnecessary to be very large for bonding to the transmission lines 126 of the touch device layer 120, i.e. the applied first flexible circuit board 130 is a low-cost and small-size flexible circuit board. Therefore, the production cost of the touch display apparatus 100a of the present embodiment can be effectively decreased, and the existing machines (not shown) can be used to bond the touch device layer 120 and the first flexible circuit board 130, and the bonding easiness is improved.

Figure 3:
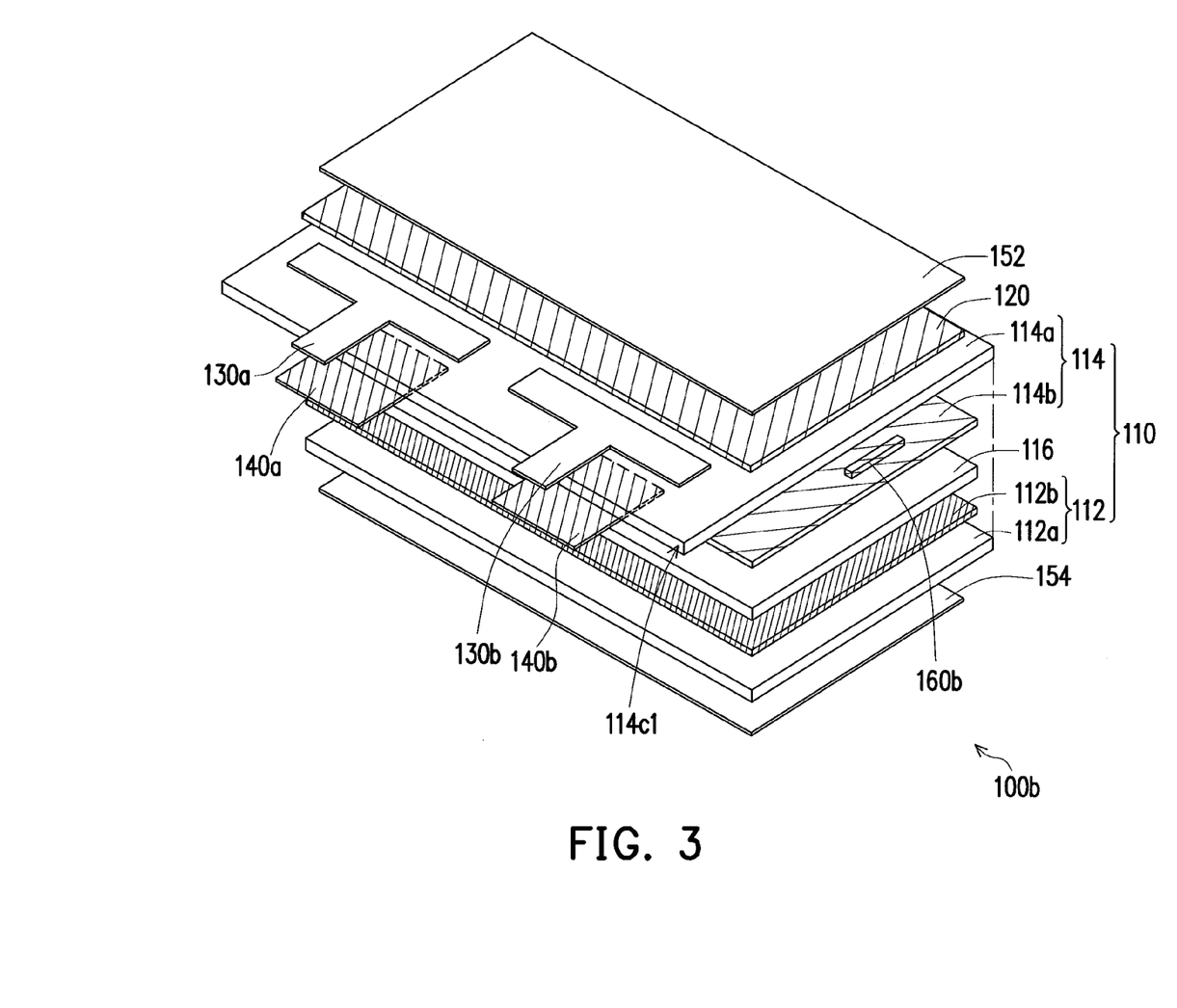
FIG. 3 is a three-dimensional exploded view of a touch display apparatus according to another embodiment of the invention.

FIG. 3 is a three-dimensional exploded view of a touch display apparatus according to another embodiment of the invention. It should be noticed that reference numbers of the components and a part of contents of the aforementioned embodiment are also used in the following embodiment, where the same reference numbers denote the same or like components, and descriptions of the same technical contents are omitted. The aforementioned embodiment can be referred for descriptions of the omitted parts, and detailed descriptions thereof are not repeated in the following embodiment.

Referring to FIG. 3, a main difference between the touch display apparatus 100b of the present embodiment and the touch display apparatus 100a of the aforementioned embodiment lies in the number and configuration position of the first flexible circuit board 130 and the second flexible circuit board 140 and the configuration position of the driving chip 160. In detail, the touch display apparatus 100b of the present embodiment includes two first flexible circuit boards 130a, 130b and two second flexible circuit boards 140a, 140b. The first flexible circuit boards 130a, 130b and the second flexible circuit boards 140a, 140b are located on the long side 114c1. The driving chip 160b located on the short side 114c1. The driving chip 160b and the second flexible circuit boards 140a, 140b are located at different sides of the active device array substrate 110. The touch display panel 100b of the present embodiment is, for example, a large size touch display panel, and in case of the large size panel, circuit coupling can be implemented by disposing two first flexible circuit boards 130a, 130b and two second flexible circuit boards 140a, 140b on the long side 114c1 of the active device array substrate 114.

In summary, since the touch device layer of the invention is disposed on the active device array substrate with a larger size of the display panel, the active device array substrate may provide a larger circuit layout space compared to that of the color filter substrate. Moreover, since the circuit layout space of the active device array substrate is larger, configuration of the devices (i.e. the transmission lines) of the touch device layer can be adjusted through the circuit layout space, such that the size of the first flexible circuit board is unnecessary to be very large for bonding and can be electrically connected the touch device layer. In this way, the production cost of the touch display apparatus of the invention is effectively decreased, and bonding easiness is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch display apparatus, comprising:
    a display panel, comprising:
        a color filter substrate;
        an active device array substrate, disposed above the color filter substrate; and
        a display medium layer, disposed between the color filter substrate and the active device array substrate;
    a touch device layer, disposed on an outer surface of the active device array substrate;
    at least one first flexible circuit board, disposed on the outer surface and an edge of the active device array substrate, and electrically connected to the touch device layer; and
    at least one second flexible circuit board, disposed on an inner surface opposite to the outer surface and the edge of the active device array substrate.

2. The touch display apparatus as claimed in claim 1, wherein the color filter substrate comprises a first substrate and a color filter layer located on the first substrate, and the active device array substrate comprises a second substrate and an active device layer located on the second substrate.

3. The touch display apparatus as claimed in claim 2, wherein the second flexible circuit board is electrically connected to the active device layer.

4. The touch display apparatus as claimed in claim 2, wherein a size of the second substrate is greater than a size of the first substrate.

5. The touch display apparatus as claimed in claim 2, wherein the touch device layer comprises:
    a plurality of first sensing series, wherein each of the first sensing series extends along a first direction;
    a plurality of second sensing series, wherein each of the second sensing series extends along a second direction intersected with the first direction, and the first sensing series are electrically insulated to the second sensing series; and
    a plurality of transmission lines, disposed at peripheral of the second substrate, and each of the transmission lines is connected to one of the first sensing series and the second sensing series.

6. The touch display apparatus as claimed in claim 5, wherein the transmission lines are a plurality of fan-in wires.

7. The touch display apparatus as claimed in claim 2, wherein the display panel further comprises a sealant, the first substrate and the substrate are assembled through the sealant.

8. The touch display apparatus as claimed in claim 1, wherein a profile of an orthogonal projection of the first flexible circuit board on the active device array substrate has a connection edge, and a length of the connection edge is smaller than ⅔ of a length of the corresponding edge.

9. The touch display apparatus as claimed in claim 8, wherein the connection edge of the first flexible circuit board has 65-135 pins.

10. The touch display apparatus as claimed in claim 1, wherein a profile of the first flexible circuit board has a T-shape.

11. The touch display apparatus as claimed in claim 10, wherein the first flexible circuit board has a tail end, and the tail end has 4-10 pins.

12. The touch display apparatus as claimed in claim 1, further comprising:
   a driving chip, disposed on the active device array substrate, wherein the driving chip and the second flexible circuit board are located on the same surface.

13. The touch display apparatus as claimed in claim 1, wherein the active device array substrate has a pair of long sides and a pair of short sides.

14. The touch display apparatus as claimed in claim 13, wherein the first flexible circuit board and the second flexible circuit board are located on one of the short sides.

15. The touch display apparatus as claimed in claim 14, wherein the touch display panel is a small size touch display panel.

16. The touch display apparatus as claimed in claim 13, wherein the at least one first flexible circuit board is two first flexible circuit boards, the at least one second flexible circuit board is two second flexible circuit boards, and the first flexible circuit boards and the second circuit boards are located on the one long side.

17. The touch display apparatus as claimed in claim 16, wherein the touch display panel is a large size touch display panel.

18. The touch display apparatus as claimed in claim 1, wherein the display panel comprises a liquid crystal display panel.

19. The touch display apparatus as claimed in claim 1, wherein the display medium layer comprises a liquid crystal layer.

20. The touch display apparatus as claimed in claim 1, further comprising:
   an upper polarizer, disposed on an outer surface of the touch device layer, and;
   a lower polarizer, disposed on an outer surface of the color filter substrate.

* * * * *